(12) United States Patent
Shiau

(10) Patent No.: US 7,364,386 B2
(45) Date of Patent: *Apr. 29, 2008

(54) IN-SITU SURFACTANT AND CHEMICAL OXIDANT FLUSHING FOR COMPLETE REMEDIATION OF CONTAMINANTS AND METHODS OF USING SAME

(75) Inventor: Bor-Jier Shiau, Norman, OK (US)

(73) Assignee: Surbec Environmental LLC, Norman, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/638,628

(22) Filed: Dec. 13, 2006

(65) Prior Publication Data

US 2007/0110520 A1 May 17, 2007

Related U.S. Application Data

(63) Continuation of application No. 11/054,582, filed on Feb. 9, 2005, now abandoned, which is a continuation of application No. 10/290,424, filed on Nov. 6, 2002, now Pat. No. 6,913,419.

(60) Provisional application No. 60/333,244, filed on Nov. 6, 2001.

(51) Int. Cl.
*B09B 1/00* (2006.01)

(52) U.S. Cl. .................................. 405/128.25

(58) Field of Classification Search ............ 405/128.1, 405/128.15, 128.25, 128.45, 128.75, 128.5
See application file for complete search history.

(56) References Cited

U.S. PATENT DOCUMENTS

| | | |
|---|---|---|
| 4,588,506 A | 5/1986 | Raymond et al. |
| 4,591,443 A | 5/1986 | Brown et al. |
| 4,867,238 A | 9/1989 | Bayless et al. |
| 5,050,676 A | 9/1991 | Hess et al. |
| 5,111,883 A | 5/1992 | Savery |
| 5,172,764 A | 12/1992 | Hajali et al. |
| 5,249,888 A | 10/1993 | Braithwaite |
| 5,251,700 A | 10/1993 | Nelson et al. |
| 5,254,761 A | 10/1993 | Parker |
| 5,277,250 A | 1/1994 | Dela |
| 5,286,141 A | 2/1994 | Vigneri |
| 5,302,287 A | 4/1994 | Losack |
| 5,346,330 A | 9/1994 | Bernhardt |
| 5,360,067 A | 11/1994 | Meo |
| 5,376,182 A | 12/1994 | Everett et al. |

(Continued)

OTHER PUBLICATIONS

Shiau et al., "Solubilization and Microemulsification of Chlorinated Solvents Using Direct Food Additive (Edible) Surfactants", Ground Water, vol. 32, No. 4, Jul.-Aug. 1994, pp. 561-569.

(Continued)

*Primary Examiner*—John Kreck
(74) *Attorney, Agent, or Firm*—Dunlap, Codding & Rogers, P.C.

(57) ABSTRACT

The present invention relates to removal of subsurface contaminants and methods of same. In more particular, but not by way of limitation, the present invention relates to an integrated method for remediating subsurface contaminants through the use of a low concentration surfactant solution (and methods of making and using novel surfactant solutions).

12 Claims, 5 Drawing Sheets

U.S. PATENT DOCUMENTS

| | | | |
|---|---|---|---|
| 5,398,756 A | 3/1995 | Brodsky et al. | |
| 5,443,118 A | 8/1995 | Yannimaras et al. | |
| 5,456,550 A | 10/1995 | Devlin | |
| 5,472,294 A | 12/1995 | Billings et al. | |
| 5,509,757 A | 4/1996 | Croy | |
| 5,584,605 A | 12/1996 | Beard et al. | |
| 5,611,642 A | 3/1997 | Wilson | |
| 5,615,974 A | 4/1997 | Land | |
| 5,653,288 A | 8/1997 | Billings et al. | |
| 5,709,505 A | 1/1998 | Williams et al. | |
| 5,741,427 A | 4/1998 | Watts et al. | |
| 5,803,664 A | 9/1998 | Kawabata et al. | |
| 5,810,514 A | 9/1998 | Suchecki, Jr. | |
| 5,965,512 A | 10/1999 | Smyth et al. | |
| 5,967,230 A | 10/1999 | Cooper et al. | |
| 6,099,206 A | 8/2000 | Pennell | |
| 6,158,924 A | 12/2000 | Athens et al. | |
| 6,913,419 B2 * | 7/2005 | Shiau | 405/128.25 |
| 7,021,863 B2 * | 4/2006 | Shiau | 405/128.15 |
| 2002/0011442 A1 | 1/2002 | McMurtrey et al. | |
| 2003/0175081 A1 * | 9/2003 | Shiau | 405/128.7 |
| 2005/0013665 A1 * | 1/2005 | Shiau | 405/128.15 |

OTHER PUBLICATIONS

Shiau et al., "Properties of Food Grade (Edible) Surfactants Affecting Subsurface Remediation of Chlorinated Solvents", Environmental Science & Technology, vol. 29, No. 12, 1995, pp. 2929-2935.
Gates et al., "In-Situ Chemical Oxidation of Trichloroethylene Using Hydrogen Peroxide", Journal of Environmental Engineering, Sep. 1955, pp. 639-644.
Lipe et al., "Micellar Enhanced Ultrafiltration and Air Stripping for Surfactant-Contaminant Separation and Surfactant Reuse", Ground Water Monitoring and Remediation 16 1, Winter 1996, pp. 85-92.
Shiau et al., "Microemulsion of Mixed Chlorinated Solvents Using Food Grade (Edible) Surfactants", Environmental Science & Technology, vol. 30, No. 1, 1996, pp. 97-103.
Sabatini et al., "Surfactant-Enhanced DNAPL Remediatin: Surfactant Selection, Hydraulic Efficiency, and Economic Factors: Environmental Research Brief", Research and Development, EPA/600/S-96/002, Aug. 1996.
Schnarr et al., "Laboratory and Controlled Field Experiments Using Potassium Permanganate to Remediate Trichloroethylene and Perchloroethylene DNAPLS In Porous Media", Journal of Contaminant Hydrology, Dec. 29, 1996, pp. 205-224.
Hasegawa et al., "Liquid-Liquid Extraction for Surfactant-Contamination Separation and Surfactant Reuse", Journal of Environmental Engineering Division ASCE 123 Jul. 7, 1997, pp. 691-697.
Knox et al., "Surfactant Remediation Field Demonstration Using a Vertical Circulation Well", Ground Water, vol. 35, No. 6, Nov.-Dec. 1997.
Sabatini et al., "Design of a Surfactant Remediation Field Demonstration Based on Laboratory and Modeline Studies", Ground Water, vol. 35, No. 6, Nov.-Dec. 1997.
"Field Applications of In-Situ Remediation Technologies", Chemical Oxidation, U.S. EPA Sep. 1998, 37 pages.
Knox et al., "Field Demonstration Studies of Surfactant-Enhanced Solubilization and Modilization at Hill Air Force Base, Utah", American Chemical Society, Chapter 5, 1999, pp. 49-63.
Nyer et al., "Hydrogen Peroxide Treatment: The Good, The Bad, The Ugly", Treatment Technology, Summer 1999, pp. 56-57.
Bin Wu et al., "Formulating Microemulsion Systems for a Weathered Jet Fuel Waste Using Surfactant/Cosurfactant Mixtures", Separation Science and Technology, vol. 35 No. 12, 2000, pp. 1917-1937.
Wickramanayake et al., "Chemical Oxidation and Reactive Barriers—Remediation of Chlorinated and Recalcitrant Compounds", Treatability Studies and Modeling for In-Situ Oxidation with Permanganate, May 2000, pp. 25-32.
Shiau et al., "Chlorinated Solvent Removal Using Food Grade Surfactants: Column Studies", Journal of Environmental Engineering, Jul. 2000, pp. 611-621.
Sabatini et al., "Integrated Design of Surfactant Enhanced DNAPL Remediation: Efficient Supersolubilization and Gradient Systems", Journal of Contaminant Hydrology, vol. 45, Issues 1-2, Sep. 2000, pp. 99-121.
Gonullu et al., "Oxidation to Remove TCE from Soil", 2001, pp. 1-13.
Lowe et al., "Field Evaluation of In-Situ Chemical Oxidation Through Vertical Well-To-Well Recirculation of NaMnO4", GWMR, Winter 2002, pp. 106-115.
Conrad et al., "Bench-Scale Visualization of DNAPL Remediation Processes in Analog Heterogeneous Aquifers: Surfactant Floods and In-Situ Oxidation Using Permanganate", Journal of Contaminant Hydrology, vol. 58, 2002, pp. 13-49.
Shiau et al., "Field Demonstration of Surfactant-Enhanced DNAPL Remediation: Two Case Studies", American Chemical Society, 2003, pp. 51-72.
"ITRC Technical and Regulatory Guidance for Surfactant/Cosolvent Flushing of DNAPL Source Zones", ITRC, 2003.
Shiau et al., "Field Demonstration of Surfactant-Enhanced DNAPL Remediation—Case Studies", Surbec-ART Environmental, L.L.C., University of Oklahoma, Tetra Tech EMI.
Sunwoo et al., "Optimal Surfactant Structures for Cosurfactant-Free Microemulsion Systems", Department of Chemistry, The University of Texas at Austin, J. Dispersion Science and Technology, 13(5), 1992, 491-514.
Pennell et al., "Surfactant Enhanced Remediation of Soil Columns Contaminated by Residual Tetrachloroethylene", Journal of Contaminant Hydrology, vol. 16, 1994, pp. 35-53.
Wu et al., "Surfactant-Enhanced Removal of Hydrophobic Oils from Source Zones", Physicochemical Groundwater Remediation, 2001, 245-267.
Shiau et al., "Field Demonstration of Surfactant-Enhanced DNAPL Remediation: Two Case Studies", Americal Chemical Society Symposium #837, American Chemical Society, 2003, 51-72.
Watts, Richard, "Hydrogen Peroxide for Physicochemically Degrading Petroleum-Contaminated Soils", Remediation Journal, vol. 2, Issue 4, Aug. 3, 2006, 413-425.
Geo-Cleanse International, Inc., Copyright 1998-2006, 6 pages.
Solubilization and Microemulsification of Chlorinated Solvents Using Direct Food Additive (Edible) Surfactants, Bor-Jier Shiau, et al., Ground Water, vol. 32, No. 4, pp. 561-569, Jul.-Aug. 1994
In-Situ Chemical Oxidation of Trichloroethylene Using Hydrogen Peroxide, Dianne D. Gates, et al., J. of Environmental Engineing, pp. 639-644, Sep. 1995.
Properties of Food Grade (Edible) Surfactants Affecting Subsurface Remediation of Chlorinated Solvents, Bor-Jier Shiau, et al., Environmental Science & Technology, vol. 29, No. 12, pp. 2929-2935, 1995.
Microemulsion of Mixed Chlorinated Solvents Using Food Grade (Edible) Surfactants, Bor-Jier Shiau, et al., Environmental Science & Technology, vol. 30, No. 1, pp, 97-103, 1996.
Laboratory and Controlled Field Experiments Using Potassium Permanganate to Remediate Trichloroethylene and Perchloroethylene DNAPLS in Porous Media, M. Schnarr, et al., Journal of Contaminant Hydrology 29, pp. 205-224, Dec. 1996.
Field Applications of in Situ Remediation Technologies: Chemical Oxidation, U.S. EPA (37 pages), Sep. 1998.
Hydrogen Peroxide Treatment: the Good, the Bad, the Ugly, Evan K. Nyer, et al., Treatment Technology, pp. 56-57, Summer 1999.
Formulating Microemulsion Systems for a Weathered Jet Fuel Waste Using Surfactant/Cosurfactant Mixtures, Bin Wu, et al., Separation Science and Technology, 35(12), pp. 1917-1937, 2000.
Chemical Oxidation and Reactive Barriers—Remediation of Chlorinated and Recalcitrant Compounds, Godage B. Wickramanayake, et al., Treatability Studies and Modeling for in Situ Oxidation With Permanganate, pp. 25-32, May 2000.
Chlorinated Solvent Removal Using Food Grade Surfactants: Column Studies, Bor-Jier Shiau, et al., Journal of Environmental Engineering, pp. 611-621, Jul. 2000.

Oxidation to Remove TCE From Soil, T. Gonullu, et al., pp. 1-13, 2001.

Hasegawa, Surfactant-Enhanced Subsurface Remediation of DNAPLS at the Former Naval Air Station, Alameda, CA, 2000.

"Surfactant-Enhanced Aquifer Remediation (SEAR) Design Manual", NFESC Technical Report TR-2206-ENV, Apr. 2002.

"Fenton's Reagent, Solvay Interox", H7-214, Sep. 1992.

"Onsite Direct Chemical Oxidation of Soil Contaminants with Hydrogen Peroxide", Solvay Interox, H7-562, Oct. 1993.

"EPA-How to Evaluate Alternative Cleanup Technologies for Underground Storage Tank Sites", May 1995, 38 pages.

"Oxyvac Success Stories", 022097-1, 6 pages.

Wolf et al., "MTBE Or Not MTBE?" Soil & Groundwater Cleanup, May 1997, 7 pages.

Andrews et al., "Oxidizing Agent Can Finsih Cleanup Where Other Systems Taper Off", Soil & Groundwater Cleanup, Jul. 1997, 4 pages.

Bryant et al., "Rapid Delivery System Completes Oxidation Picture", Soil & Ground Water Cleanup, Aug.-Sep. 1998, 11 pages.

"Common Questions Relating to Geo-Cleanse", 18 pages.

"Geo-Cleanse Midwest", 3 pages.

* cited by examiner

IN-SITU SURFACTANT AND CHEMICAL OXIDANT FLUSHING FOR COMPLETE REMEDIATION OF CONTAMINANTS AND METHODS OF USING SAME

CROSS-REFERENCE TO RELATED APPLICATIONS

This application is a continuation of U.S. Ser. No. 11/054,582, filed Feb. 9, 2005, now abandoned, which is a continuation of U.S. Ser. No. 10/290,424, filed Nov. 6, 2002, now U.S. Pat. No. 6,913,419, wich claims the benefit under 35 U.S.C. § 119(e) of U.S. Provisional Application Ser. No. 60/333,244, filed Nov. 6, 2001, entitled "USE OF IN-SITU SEQUENT AND CHEMICAL OXIDANT FLUSHING FOR COMPLETE REMEDIATION OF CONTAMINATED SOILS AND GROUNDWATERS", the contents of which are expressly incorporated herein in their entirety by reference.

BACKGROUND

1. Field of the Invention

The present invention relates to removal of subsurface contaminants and methods of same. In more particular, but not by way of limitation, the present invention relates to an integrated method for remediating subsurface contaminants through the use of a low concentration surfactant solution (and methods of making and using novel surfactant solutions) followed by an abiotic polishing process to thereafter achieve a substantially reduced subsurface contaminant concentration that surfactant flushing alone cannot achieve.

2. Background Information Relating to the Invention

Surfactant enhanced subsurface remediation (SESR) is a unique technology for expediting subsurface remediation of non-aqueous phase liquids (NAPLs). Studies known to those in the art have previously evaluated the SESR technology in both laboratory scale studies and field scale demonstration studies. Traditionally, the surfactant system in SESR (typically an anionic or nonionic surfactant), is designed to remove organic contaminants (including chlorinated solvents) from contaminated soil. Surfactant systems significantly increase the solubility of hydrophobic organic compounds and, if properly designed and controlled, also significantly increase the mobility of NAPLs. A significantly reduced remediation time thereby results as well as increased removal efficiency (up to 3 or 4 orders of magnitude) and reduced cost of NAPL removal through use of surfactant system for subsurface remediation.

Surfactant flushing solutions, typically, can be designed to be effective under most subsurface conditions. In most cases, the effectiveness of the surfactant flushing solutions is not reduced due to the presence of more than one contaminant. Naturally-occurring divalent cations and salts may affect the performance of certain surfactants, as well as the removal efficiency for cationic heavy metals. It is possible, however, to design an effective surfactant system for removal of the target contaminants under any of these conditions. A number of factors influence the overall performance and cost effectiveness of SESR systems. These factors include: Local ground water chemistry; Soil chemistry (e.g. sorption, precipitation); Ability to deliver the surfactant solution to the area of contamination; Surfactant effects on biodegradation of the NAPL compounds as well as degradation of the surfactants; Public and regulatory acceptance; Cost of the surfactant; Recycle and reuse of the surfactant, if necessary; and Treatment and disposal of waste streams. Bench scale tests (treatability studies) must be conducted on site specific soils and NAPL (if available) to ensure the optimal system is selected for a particular site.

Surfactant flushing can remove a large portion of the mass of subsurface contaminant liquid. In general, it is not expected that surfactant flushing alone will have a high probability of reducing the subsurface contaminant concentration to a level necessary to allow the site to be considered "remediated." Therefore, a treatment train (or integrated) approach is necessary to speed up or achieve the closure of the site. It is to such an integrated approach involving a preselected surfactant solution flush coupled with an abiotic oxidation polishing step and methods thereof that the present invention is directed.

SUMMARY OF INVENTION

The present invention is directed to a method for substantially removing subsurface contaminants through an integrated approach utilizing a preselected surfactant solution and a preselected chemical oxidant. Such an innovative integrated approach satisfies a need in the marketplace for a cost-effective and less time consuming system to remove substantially all subsurface contaminants—a level of remediation has been traditionally unavailable. A method of the present invention comprises the steps of introducing an effective amount of at least one preselected surfactant solution and an effective amount of at least one preselected chemical oxidant. The combination of the preselected surfactant solution and the preselected chemical oxidant are capable of substantially removing subsurface contaminants. Additionally, the present invention relates to a subsurface contaminated site that is substantially remediated by this integrated approach and novel surfactant solutions.

DETAILED DESCRIPTION OF INVENTION

Figure 1:
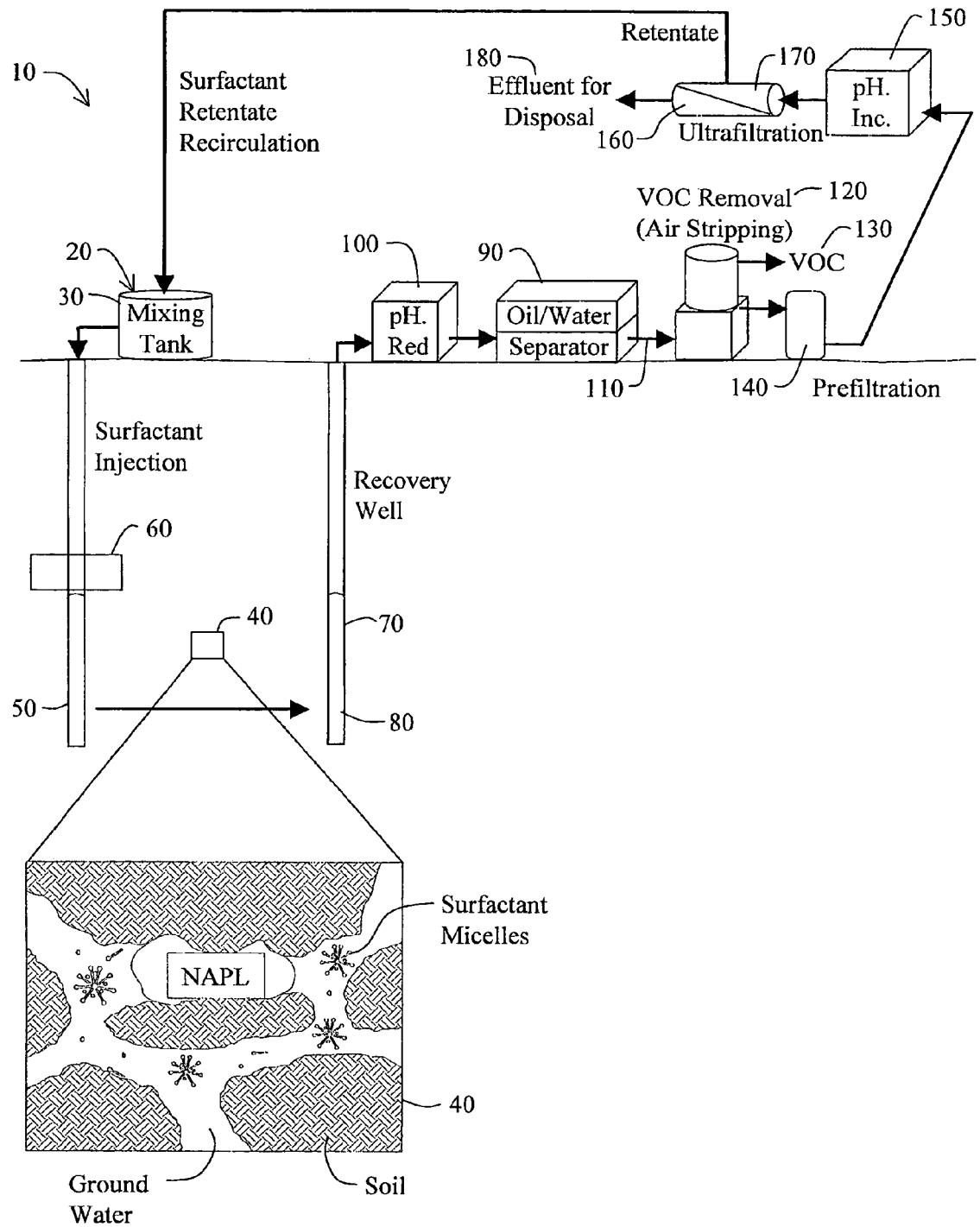
FIG. 1 is a schematic diagram showing, generally, an integrated surfactant flushing and treatment system according to the present invention.

It is to be understood that the invention is not limited in its application to the details of construction and the arrangements of the components set forth in the following description (e.g. texts, examples, data and/or tables) or illustrated or shown in the drawings. The invention is capable of other embodiments or of being practiced or carried out in various ways. Also, it is to be understood that the phraseology and terminology employed herein is for purpose of description and should not be regarded as limiting and one of ordinary skill in the art, given the present specification, would be capable of making and using the presently claimed and disclosed invention in a broad and non-limiting manner.

As used herein, the term "subsurface contaminant" refers to any organic or inorganic impurity or halogenated solvent (such as a chlorinated solvent) that is toxic to the underground surface. Additionally, the term "surfactant solution" refers to any anionic or nonionic surfactant or cosurfactant combination that is functionally capable of removing organic or inorganic contaminants as well as halogenated solvents (such as a chlorinated solvent) from a contaminated subsurface area, such as subsurface soil or water systems. Further, the term "oxidant" refers to any oxidizing agent capable of degrading a contaminated plume or entrapped residual pollutants whether they are organic, inorganic, or halogenated solvents. The term "polishing step" as used herein, refers to the innovative abiotic process of the presently disclosed and claimed invention that includes the steps of injecting or introducing predetermined concentrations of a chemical oxidant to further degrade and reduce the subsurface contaminant subsequent to a surfactant flushing step. "Integrated approach" as used herein, refers to a low concentration surfactant flush in combination with the abiotic polishing step. "Remediation" as used herein, refers to the substantially complete removal of soil and groundwater pollutants by various treatments or restoring methods to achieve the standard set by the responsible regulatory agency for the particular contaminated subsurfact system (e.g. National Primary Drinking Water Regulations (NP-DWR) for subsurface ground water).

Due to certain advantages associated with the use of the integrated approach of the presently claimed and disclosed invention, one of ordinary skill in the art will most likely recognize the benefits of this approach when time is of the essence. One such advantage is that by using the low concentration surfactant flush step in combination with the subsequent abiotic polishing step, a higher probability exists of reducing the subsurface contaminant concentration to a level necessary to allow the site to be considered remediated—i.e. substantially all contaminats have been removed. This process will tend to achieve minimal pollutant content of the underground surface while decreasing the time spent as compared to prior art techniques that utilize a higher concentration surfactant flush as the sole means of remediating a contaminated site.

Prior to Applicant's inventive concept, higher concentration surfactant flushing alone has been the common method of site remediation. As shown in FIG. 1, the present invention includes an overall integrated surfactant flushing and treatment system 10. A pre-determined surfactant solution 20 is prepared in a mixing tank 30. After the surfactant solution 20 is prepared, the surfactant-NAPL phase behavior is evaluated on-site. If the surfactant solution 20 meets all criteria set for the surfactant—NAPL phase behavior, such as optimal microemulsion (either Winsor Type III or Type I) the surfactant solution 20 is delivered to a targeted treatment zone 40 via an injection well 50 and a pumping system 60. Removed contaminant and surfactant solution 70 is extracted from a recovery well 80. The free-phase oil is separated from the surfactant stream in an oil/water separator 90. If the contaminant and surfactant solution 70 is pH sensitive for its recovery, a pH-adjustment tank 100 could be added before the oil/water separator 90 to reduce the solution pH and enhance the surfactant separation. From the oil/water separator 90, a waste stream 110 is sent to an air stripper 120 or other equipment (such as liquid-liquid extraction) to remove dissolved volatile organic chemicals (VOC) 130. The waste stream 110 is delivered to a prefiltration system 140 to remove the large solid particle or sediment in the waste stream 110. If surfactant reuse is required, the waste stream 110 will go through a second pH-adjustment tank 150 and an ultrafiltration membrane system 160. Most surfactant micelle phase will be rejected at the retentate side 170 and sent back to the mixing tank 30 for reuse. The waste water containing mainly surfactant monomer and trace contaminant will pass through the ultrafiltration membrane system 160 for final disposal 180 or sent to a wastewater treatment plant for treatment.

As outlined and shown in particular examples hereinafter, the Applicant's presently claimed and disclosed methodology demonstrates significant removal of NAPL from a contaminated source area via remediation. In one embodiment of this invention, surfactant flushing projects were conducted at a surfactant concentration ranging between 3 to 8 wt % of surfactant based upon the total weight of the surfactant solution (e.g. 3 wt % would be 3% surfactant/97% water or other solvent). This range may be somewhat over-conservative because, within this range of surfactant concentrations, reuse or reconcentration of the recovered surfactant typically is necessary to improve the economics of the overall project. In order to recover/separate the surfactant, contaminant concentrations must be reduced to acceptable levels in the surfactant solution and then the surfactant must be re-concentrated for reinjection. In other embodiments of this invention, surfactant concentrations in a range from about, 0.05% to about 15 wt % are contemplated for use. In a most preferred embodiment of this invention, a lower surfactant concentration, such as 0.1%, is most desirable. Several advantages of using a low surfactant concentration, are: (1) significant savings on chemical use and project cost; (2) minimizing and/or completely eliminating the reuse and recycling of the recovered surfactant; and (3) improving the above-ground treatment efficiency (e.g., less retention time for breaking the macro- or microemulsion during the oil/water separation stage, and less foaming of surfactant). Therefore, the ability of lowering the costs of a SESR project, such as with utilizing a lower surfactant concentration, further improves the total cost effectiveness for the remediation of sites. The quantity of surfactant necessary for use with the presently disclosed and claimed invention is up to one order of magnitude (from several weight percents reduced to several thousands ppm or mg/L) less than prior art surfactant flushing systems used for light non-aqueous-phase liquids (LNAPLs) as well as for dense non-aqueous phase liquids (DNAPLs).

The surfactant solution of the presently claimed and disclosed invention may be any anionic, cationic, or nonionic surfactant or any combinations thereof as well as one or more combinations thereof. These combinations include, but are not limited to: anionic surfactant/anionic surfactant; anionic surfactant/nonionic surfactant; anionic surfactant/cationic surfactant; nonionic surfactant/nonionic surfactant; and nonionic surfactant/cationic surfactant combinations, to name but a few of the possible permentations.

Further, the present invention encompasses an abiotic process to address the post-surfactant polishing step to further enhance site remediation. This abiotic process involves injecting pre-determined concentrations of chemical oxidant to degrade the dilute contaminant plume and/or trace entrapped residual pollutant(s) that remain after the surfactant flushing step. The effectiveness of these oxidants depends on the types of contaminants and geological formations found at the site. Thus, the chemical oxidant is chosen or "predetermined" based on an analysis of the site:

i.e. the functionality of the chemical oxidant must match or be capable of degrading any remaining contaminants or pollutants. Thus, one of ordinary skill in the art, given the present specification, would be capable of selecting an appropriate chemical oxidant given an identification of the contaminants or pollutants to be remediated.

The two most common oxidizing agents used for in-situ chemical oxidation are hydrogen peroxide and potassium permanganate, yet various other oxidizing agents including, but not limited to, sodium permanganate, ozone, chlorine dioxide, or dissolved oxygen may be used. In the chemical oxidation process known as Fenton's reaction, injection of hydrogen peroxide is typically combined with an iron catalyst under reduced pH conditions to generate powerful hydroxyl free radicals (OH). Since 1934, Fenton's reagent has been recognized as an effective means for destroying organic compounds in wastewater and most recently as an in-situ treatment method for soil and groundwater. The dissolved iron acts as a catalyst for generating the hydroxyl radical, resulting in free-radical oxidation of the contaminant. A low pH is necessary to keep the iron in the ferrous state. While the reaction can be performed successfully at a pH range between 5 and 7, the performance improves at even lower pH values (as low as 2 to 3). Obtaining optimal subsurface pH conditions is often limited by the soil buffering capacity, which is site-specific. For example, if naturally-occurring carbonates in the soil are high, a significant acid dose is required to reduce the pH at the site and thereby improve the performance of the oxidizing agent.

Potassium permanganate oxidation creates little heat or gas, therefore contaminant treatment occurs primarily through oxidation. Potassium permanganate is an oxidizing agent with a unique affinity for organic compounds containing carbon-carbon double bonds, aldehyde groups or hydroxyl groups. Under normal subsurface pH and temperature conditions, the primary oxidation reaction for perchloroethylene (PCE) and trichloroethylene (TCE) involves spontaneous cleavage of the carbon-carbon bond. Once this double bond is broken, the highly unstable carbonyl groups are immediately converted to carbon dioxide through either hydrolysis or further oxidation by the permanganate ion. Selection of the proper oxidant is based on several factors including, but not limited to, contaminant characteristics, site geochemical conditions, soil buffering conditions of site, and etc. Fenton's reagent is capable of oxidizing a wide range of compounds while potassium permanganate is more selective and is best suited for chlorinated ethene contaminants such as PCE and TCE. Potassium permanganate often provides more rapid destruction of specific compounds when compared to Fenton's reagent, however.

Previous prior art results from field tests raised concerns on the effectiveness of using chemical oxidation for contaminated source zone remediation. Mainly, this was due to the high concentration of oxidant required, the large amount of heat and gas released in the subsurface, and the formation of solid-precipitate at the surface of the contaminant liquid pool. Utilizing the presently disclosed and claimed methodology, however, the bulk of the contaminant has been previously removed by surfactant flushing, followed by a very low concentration (preferrably less than 0.5 wt %) of oxidant can be used, and the amount of heat generated and the volume of gas released ceases to be a limiting factor. Using the methodology of the presently claimed and disclosed invention, surfactant flushing followed by chemical oxidation is highly effective for contaminant remediation. Thus, neither surfactant flushing nor chemical oxidation alone can accomplish substantially, one hundred percent remediation of a contaminated site. The combination of surfactant flushing followed by chemical oxidation does, however, result in a substantially remediated site that had been contaminated prior to treatment. The presently disclosed and claimed methodology greatly reduces the long-term risk and financial burden of the owner of the contaminated site in a site closure program versus a maintenance-like approach such as pump-and-treat. The uniqueness of the presently claimed and disclosed integrated process approach provides significant improvement on the NAPL clean-up efficiency as compared to the stand-alone surfactant flushing and stand alone in situ chemical oxidation for site remediation effort.

Experiment Methodology

Surfactant Selection and System Design. Selection of the proper surfactant system utilizing a series of laboratory screening tests is one of the most crucial steps in conducting a successful surfactant flushing project. Laboratory surfactant screening typically consists of the following tests: contaminant solubilization tests, surfactant-NAPL phase behavior properties tests, surfactant sorption and precipitation tests, and contaminant extraction-column studies. Representative procedures of these tests are briefly described below. One of ordinary skill in the art, however, would appreciate the significance and steps necessary to conduct such tests given the present specification. The purpose of these tests is to select the best surfactant system for application at the site—the surfactant is optimized for both the physical and chemical conditions of the site and the contaminant.

Contaminant solubilization of NAPL Solubilization tests are used to determine the solubilization capacity of the surfactant systems (see e.g. Shiau et al., 1994; Rouse et al. 1993). For a DNAPL contaminant, the objective of the solubilization test is to select a surfactant system with ultra-solubilization potential without mobilizing the NAPL. For a LNAPL contaminant, the optimal surfactant system is chosen based on mobilization of NAPL under the ultra-low interfacial tension condition. Typically, surfactant systems under such conditions will produce a so-called Winsor Type III (or the middle phase) microemulsion via testing of surfactant-NAPL phase behavior properties (Shiau et al., 1994). The solubilization capacity of site-specific NAPL is determined for the surfactants by two methods: direct visual observation (see Shiau et al., 1994) and gas chromatography/flame ionization detector (GC/FID) (i.e., EPA Method 8015 for gasoline range organics (GRO), diesel range organics (DRO), and other volatile organic chemicals (VOCs)) and/or gas chromatography/photoionization detector (GC/PID) measurement (i.e., EPA Method 8021B for BTEX compounds). Direct visual observation is used as a preliminary screening tool for various surfactant and NAPL systems. When a proper surfactant/cosurfactant system is utilized, a middle-phase microemulsion (a translucent liquid phase intermediate between the water and NAPL phases) is observed in a mixture of surfactant and NAPL system.

Surfactant-NAPL phase behavior properties. The difference between a microemulsion and macroemulsion (or emulsion) is that a microemulsion is thermodynamically stable while a macroemulsion is thermodynamically unstable and will ultimately separate into oil and water phases. Typically, a macroemulsion of NAPL and surfactant mixture appears opaque after equilibration. During the surfactant-NAPL phase behavior testing, equal volume of NAPL and surfactant solution was added to a batch reactor (at capacity between 10 mL to 40 mL) and the system was adjusted with salt (NaCl), hardness ($CaCl_2$), or cosolvent (short chain alcohols) to change the hydrophobicity, a crucial parameter to achieve the optimal surfactant phase behavior, of NAPL and surfactant mixture. The solution was shaken and left to equilibrate at room temperature (18° C.) following a 24-hour pre-mixing period. Formation of a stable middle-phase microemulsion becomes complete within a few hours to one day. The presence of a middle-phase microemulsion is confirmed by visual observation (formation of a translucent liquid) and instrumentation (measuring the ultra-low interfacial tension (IFT) with a spinning drop tensiometer). (See Cayias et. al, 1975; Shiau et. al, 2000).

Sorption, Precipitation, and Phase Behavior Analyses. These tests assess the potential for surfactant losses under subsurface conditions (see Shiau et al., 1995 for details). Surfactants can be lost due to sorption, precipitation, and adverse phase behavior reactions. Excess surfactant sorbed or precipitated onto soil inhibits system effectiveness and increases costs. Sorption testing quantifies the amount of surfactant lost to soil and facilitates a surfactant comparison analysis. Some surfactants may precipitate or phase separate due to the presence of salts, divalent cations or temperature fluctuations. It is essential to ensure that the surfactant will not precipitate under site specific aquifer conditions. Surfactant loss due to precipitation and/or phase separation not only hinders performance but also plugs the aquifer. Formation of an opaque solution in a mixture of NAPL/surfactant indicates an adverse phase behavior, which does not provide a satisfactory sweep efficiency and/or solubilization capacity in the subsurface.

Contaminant Extraction-Column Studies. One-dimensional (1-D) column tests are conducted to simulate flow through conditions in the aquifer (see Shiau, et al., 2000 for detailed procedures). Although it is difficult to simulate actual site conditions, valuable information can be obtained from column studies. This information includes solubilization enhancement under continuous flow conditions and head losses during flushing through the media.

The results of the column studies aid in the design of pilot and potential full-scale application designs of the presently claimed and disclosed inventive methodology. Column test results are used to quantify the number of pore volumes (PV) required to mitigate the NAPL for each surfactant system and the polishing step. Previous laboratory and field studies indicate that the solubilization mechanism requires 3-15 PV for most NAPL mass recovery (Shiau, et al. 2000). For the mobilization mechanism, the required surfactant solution flush is between one to two pore volumes (PV) to recover the majority of the NAPL mass. From site soil-packed columns, residual saturation is achieved in the column by adding the site-specific contaminant(s) to the column (between 0.01 to 0.2 PV) followed by water to remove excess contaminant. A mass balance of NAPL is determined to estimate the residual concentration.

Under low surfactant concentration conditions (<1 wt % of surfactant), reuse and recycling of surfactant is economically unnecessary for full-scale implementation. If injection of a higher concentration surfactant is necessary at the particular site, one of ordinary skill in the art could use membrane-based systems, such as Micellar Enhanced Ultrafiltration (MEUF), to recover and reuse the surfactant. (Lipe et al., 1996; Sabatini et al., 1998b.)

Chemical Oxidation as a Polishing Step. In the presently claimed invention and disclosed invention, surfactant flushing is followed by a polishing stage utilizing the introduction of a chemical oxidant to substantially degrade the contaminant left in the soil and groundwater subsequent to the surfactant flushing step. Bench-scale experiments were conducted to evaluate the effectiveness of in-situ chemical oxidation in order to illustrate and evaluate the primary performance characteristics of the technology, including (1) oxidant-contaminant reaction kinetics, (2) matrix interactions and other secondary geochemical effects, (3) subsurface oxidant transport, (4) overall oxidant consumption, and (5) contaminants treated and overall reductions achieved Chemical Oxidant Selection and System Design. The first step in the process of chemical oxidant polishing is selecting the proper oxidant for the site. The two most common oxidants used for process applications are hydrogen peroxide and potassium permanganate, however sodium permanganate, ozone, chlorine dioxide, dissolved oxygen or any other oxidant, in which a person having ordinary skill in the art may be familiar, may be tested and be used in this system. To ensure a successful project, several design steps of a chemical oxidation polishing system must be satisfied. An understanding of relative reaction rates and the life span of reactants are required to ensure adequate contact time for the desired reactions. The chemical demand associated with pH adjustment must be evaluated since many of the oxidation reactions are pH-dependant. In addition, geochemical characteristics of the site must be identified to help predict how naturally occurring mineral and organic fractions within the soil and ground water will affect the process.

Before installing a field-scale chemical oxidation system, certain data must be collected to ensure proper chemical addition ratios and reaction times are achieved at the site. This information may include, but is not limited to, data on the reaction kinetics, pH conditions, and naturally occurring interference within the subsurface for the specific site. In addition, mobility control and transport of the injected oxidant to the target areas is crucial, especially at a site with less of a permeability zone and having high organic and mineral interference.

Degradation Test. Similar to surfactant screening tests, bench-scale oxidation degradation studies (i.e., batch tests and one-dimensional column studies) are performed in the laboratory to investigate the reaction rates and mechanisms for the previously discussed oxidants using soils, NAPL (if available), and contaminated groundwater collected from the demonstration site. In the laboratory batch tests/kinetic studies, the samples are prepared in the reactor (e.g., 40 ml EPA vials) spiked with site contaminants (i.e., LNAPL and/or DNAPL) at the pre-determined concentrations (from high ug/L to low mg/L). These are the typical pollutant levels observed at the dilute plume area and/or after most NAPL mass has been removed from the contaminant source area. The Fenton's reagent and permanganate constituents required to promote the respective oxidation reactions were added to the reactor (e.g., 40 mL vials) at concentrations between 500 mg/L to ten percent. The samples were equilibrated for various reaction periods (from hours to days) at the demonstration site groundwater temperature. The final contaminant(s) and oxidant concentrations were measured. Changes of reaction parameters, such as pH and redox potential, Eh, were recorded. The reaction rate constants were calculated to quantify the removal of contaminant(s).

In addition, the demand for pH adjustment during chemical oxidation was evaluated, since many of the reactions involved are pH dependent. Maintaining the proper pH conditions for Fenton's oxidation is crucial to the availability of the ferrous ion ($Fe^{2+}$) catalyst. The buffer capacity of the soil determines whether pH adjustment for chemical oxidation is effective and/or economical. To evaluate the effects of pH, testing was performed using potassium permanganate and Fenton's reagent under acidic, neutral, and basic conditions. Similar batch/kinetic tests for varying solution pH were conducted as previously described. Soil and groundwater conditions can affect chemical oxidation performance through direct competition with contaminants for the oxidant and should, therefore, be taken into account.

The primary interference with Fenton's oxidation is carbonate and bicarbonate, which influence pH conditions and compete with contaminants for the hydroxyl radical. Elevated soil organic matters react with Fenton's reagent and potassium permanganate. Oxidation of heavy metals, such as trivalent chromium (Cr(III)), remobilize the toxic form of metals like hexavalent chromium, Cr(VI), and therefore increase the unwanted risk at the site. If potential risk of remediation of Cr is present, additional tests are conducted to address these concerns depending on the selected site conditions (e.g. Cr desoprtion test in the soil peak columns). Typically, a phased approach is used to streamline the tests and minimize the number of tests. This can be achieved by evaluating the degradation rates of the targeted pollutant using the potential oxidants in a batch experiment. Only those oxidants with favorable degradation rates will be further investigated on their consumption rate with the site-specific soil. The chemical oxidant with minimum mass losses to the soil is thereafter tested in a one-dimensional column or a two-dimensional sand tank in order to optimize their conditions for complete degradation of pollutant in field. The optimal chemical oxidation system is thereafter able to be selected for the field application and is therefore site specific or site optimized.

EXAMPLE 1

Sequent Surfactant Flushing and Chemical Oxidation for LNAPL Remediation—a Gasoline-Contaminated Underground Storage Tank (UST) Site A particular gasoline contaminated-site is located in the southeastern Oklahoma town of Golden. The main contaminant is gasoline fuel as a result of the leakage of USTs from two former corner gas stations. Depth to the contaminated zone was 5 to 25-feet. Most free phase LNAPLs were trapped in the shallow zone (5 to 15 ft) containing sandy silt, silty clay, and silt. The treated area covered approximately 25,000 $ft^2$. The primary goal of the project was to remove all free phase gasoline. The secondary goal was to demonstrate a significant decrease in soil and groundwater concentrations (one to two orders of magnitude). The tertiary goal was to see how low the final contaminant concentration in groundwater could be achieved, to approach the Maximum Contaminant Level (MCL).

Before field implementation, Golden site LNAPL, and soil and groundwater samples were obtained and used to screen for the optimal surfactant systems. In the laboratory screening experiments, four anionic surfactant/cosurfactant mixtures were investigated for their potential use in remediating Golden LNAPL (fuel gasoline) with the in situ surfactant flushing technology disclosed and claimed herein. The selected surfactant/cosurfactant included mixtures of (1) sodium dioctylsulfosuccinate (AOT:75% active. Aerosol OT 75% PG surfactant, by Cytec Industries, Inc., West Paterson, N.J., USA) and sodium dihexylsulfosuccinate (AMA), (2) AOT and polyoxyethylene sorbitan monooleate (Tween 80), (3) AOT and linear alkyl diphenyloxide disulfonate (Calfax 16L-35% active, by Pilot Chemical Company, Santa Fe Springs, Calif., USA), and (4) Alkylamine sodium sulfonate (Lubrizol DP10052) and AMA. All surfactant solutions were prepared according to their percent activity. For example, a 100 g 0.75% AOT solution is prepared by adding 1 g of AOT raw material (75% active) to 99 g of $H_2O$ (water). The laboratory screening activities consisted of numerous tests including surfactant-NAPL phase behaviors, surfactant sorption and precipitation, and contaminant extraction-column studies as described previously in the experiment methodology section (also see Shiau et. al., 1994; Shiau et. al. 1995; Shiau, et. al. 2000). As shown in Table 1, batch surfactant screening experiments indicate that all four surfactant mixtures used can achieve Winsor Type III (middle-phase) microemulsion with Golden site NAPL, mostly at total surfactant concentration less than 1 wt %.

TABLE 1

Summary of Surfactant/NAPL Phase Behaviors

| Surfactant System | Surfactant Concentration Evaluated wt % | Appearance of Winsor Type III Microemulsion | NAPL (TPH) solubility at optimal Type III system mg/L | Equilibrated Time of Stable Type III Microemulsion[1] (hr) |
|---|---|---|---|---|
| AOT/AMA | 1 to 2 | transparent | 440,000 | 1 to 2 |
| AOT/Tween 80 | 0.2 to 1 | translucent | 400,000 | 8 to 12 |
| AOT/Calfax16L-35[2] | 0.2 to 1 | translucent | 450,000 | 1 to 2 |
| Lubrizol DP/AMA[3] | 0.2 to 1 | opaque | 400,000 | 8 to 12 |

[1] NaCl (ranging from 0.1 to 3 wt %) was used to achieve the optimal Type I system at various ratios of surfactant mixtures
[2] Surfactant system used at Golden UST site
[3] A small portion of the contaminated zone was treated with this surfactant Table IA illustrates the formulation of the preferred surfactant system AOT/Calfax 16L-35 used at the Golden site for gasoline clean-up. Also surfactant formulations for other conatminants, such as disel fuel and TCE, are also listed in Table IA.

(total concentration=0.94 wt %) at AOT/Calfax weight ratio of of 0.75/0.01 g with 1.2% NaCl added. The prepared formulation is shown in Table IA.

For the polishing step, abiotic chemical oxidation was used to treat the residual oil and dilute plume at the shallow

TABLE IA

| Contaminants | Surfactant wt % | Cosurfactant wt % | Electrolyte wt % | Type of Microemulsion |
|---|---|---|---|---|
| Gasoline | Dioctylsulfosuccinate (AOT) 0.75 | sodium linear alkyl diphenyloxide disulfonate (Calfax 16L-35) 0.19 | NaCl 1.2 | Winsor Type III |
| Diesel Fuel | dioctylsulfosuccinate (AOT) 0.75 | sodium linear alkyl diphenyloxide disulfonate (Calfax 16L-35) 0.19 | NaCl 1.7 | Winsor Type III |
| TCE | Dioctylsulfosuccinate (AOT) 0.77 | sodium linear alkyl diphenyloxide disulfonate (Calfax 16L-35) 0.27 | NaCl 1.84 | Winsor Type III |

The screening tests were conducted at different surfactant/cosurfactant ratios by adding various amounts of NaCl to promote the formation of a middle-phase (or Winsor Type III) microemulsion. In these tests, a low surfactant concentration (<1 wt %) approach was found to significantly improve the cost effectiveness of the site clean-up effort. Based on the screening tests, it was concluded that one surfactant system was the best candidate for the site-specific conditions (i.e., able to produce a translucent middle-phase microemulsion with ultra-low interfacial tension at value <0.005 dyne/cm and the highest NAPL solubility): a combination of anionic surfactant mixture, AOT/Calfax 16L-35 zone of this site the Golden site. Both Fenton's Reagent and potassium permanganate were evaluated. As shown in Table 2, at a low concentration of chemical oxidant, Fenton's Reagent appeared to be more favorable in treating the BTEX compounds found at the site.

TABLE 2

Representative Results of BTEX Degradation with Fenton's Reagent

| Fenton's Reagent Used | Benzene[1] % reduction | Toluene % reduction | Ethylbenzene % reduction | m,p-Xylene % reduction | o-Xylene % reduction |
|---|---|---|---|---|---|
| $H_2O_2$ = 2,000 mg/L $Fe^{+2}$ = 90 mg/L pH = 2 to 3 adjusted by 50% $H_2SO_4$ | 92 | 44 | 59 | 47 | 44 |
| $H_2O_2$ = 2,000 mg/L $Fe^{+2}$ = 90 mg/L pH = 2 to 3 adjusted by 50% $H_2SO_4$[2] | 93 | NA[2] | NA | NA | NA |
| $KMnO_4$ = 5,000 mg/L[3] | 8 | NA | NA | NA | NA |

[1]Initial BTEX mixtures containing 1,000 ug/L of individual compound; reaction time = 12 hr
[2]Initial benzene-only concentration = 4,000 ug/L; NA = not available
[3]Initial benzene-only concentration = 1,000 ug/L For example, 93% of the initial 4,000 μg/L benzene was degraded using a Fenton's Reagent, containing $H_2O_2$, 2,000 mg/L, $Fe^{+2}$, 90 mg/L, pH value @ 2 to 3. Benzene degradation was only 8% of the initial 1,000 μg/L benzene after a 5,000 mg/L $KMnO_4$ solution was added.

As shown in Table 3, one-dimensional column tests were conducted to assess the contaminant removal under hydrodynamic condition. Injection of a one pore volume of AOT/Calfax (0.94%) mixture was able to mobilize >90% of the trapped LNAPL from the 1-D column.

TABLE 3

Summary of 1-D Column Study Results

| Process Used | Post-surfactant (Step 1) % contaminant removed | Post-surfactant + chemoxid (Step 2) % contaminant removed | Total contaminant removal % |
|---|---|---|---|
| Step 1: Surfactant: AOT/Calfax (0.94 wt %) + NaCl 1.2 wt % (1PV) Step 2: Fenton's Reagent: $H_2O_2$ (0.4 wt %) $Fe^{+2}$ (90 mg/L) pH = 2.6 | 91[1] | 8.6[2] | 99.6[2] |

Figure 2:
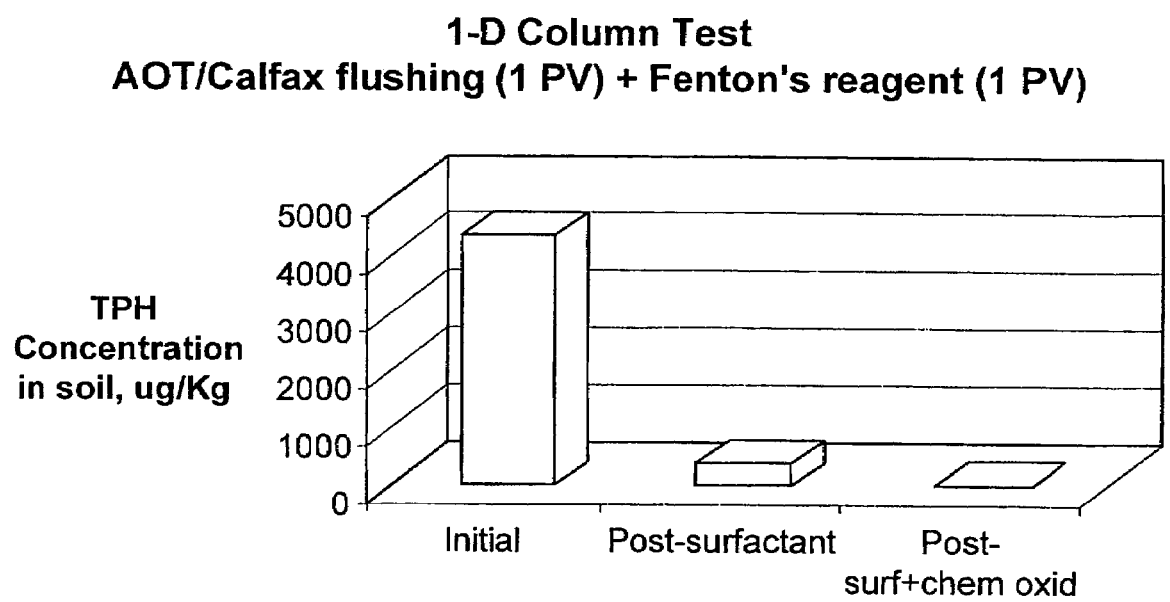
FIG. 2 is a graphical representation showing the results of a NAPL removal test in a one-dimensional (1-D) column.

[1] Estimated based on the mobilized NAPL volume and dissolved NAPL data; initial column oil saturation = 2%
[2] Based on final soil extraction measurement Fenton's Reagent was selected to polish the residual NAPL after the surfactant flood. Representative column results are shown in FIG. 2 and Table 3. In the soil column, the total NAPL removed (measured by total petroleum hydrocarbon, TPH, or gasoline range organics, GRO) was 99.6%. Without the polishing step (chemical oxidation), the surfactant flushing alone could not achieve remediation to an extremely low contaminant level in the soil. Direct injection of a high concentration Fenton's Reagent ($H_2O_2$ level at 10 wt %) would have required multiple pore volumes (>5 PV) to achieve 80% to 90% contaminant removal (data not shown). Therefore, laboratory experiments indicated that integrated surfactant flushing followed by chemical oxidation would be able to treat the Golden site NAPL to extreme low level concentrations (low ppb range).

Figure 3:
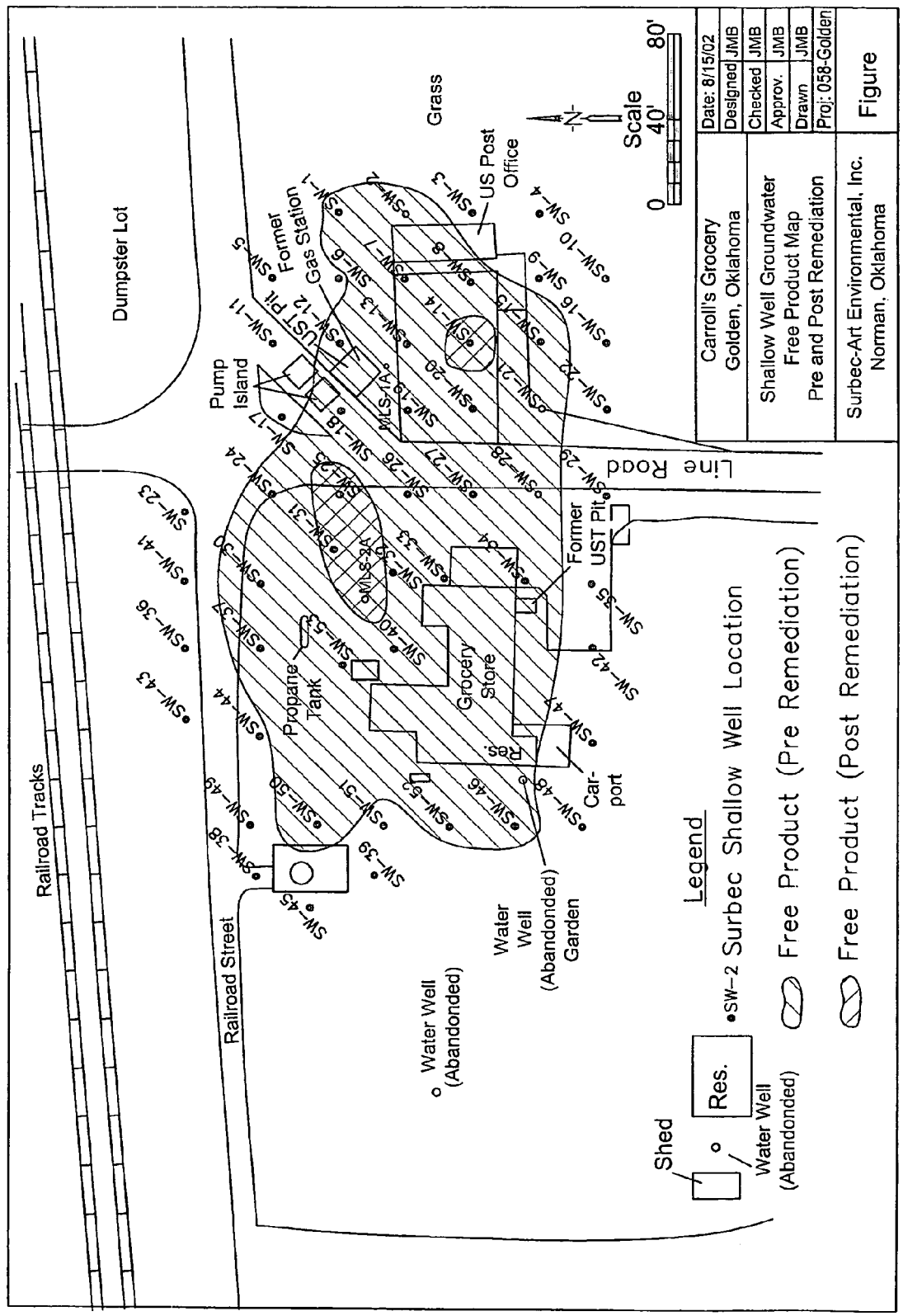
FIG. 3 is a schematic representation of pre- and post-surfactant free phase gasoline distribution in a "Shallow Zone" at an underground storage tank contamination site—i.e. Carroll's Grocery in Golden, Okla.
Figure 4:
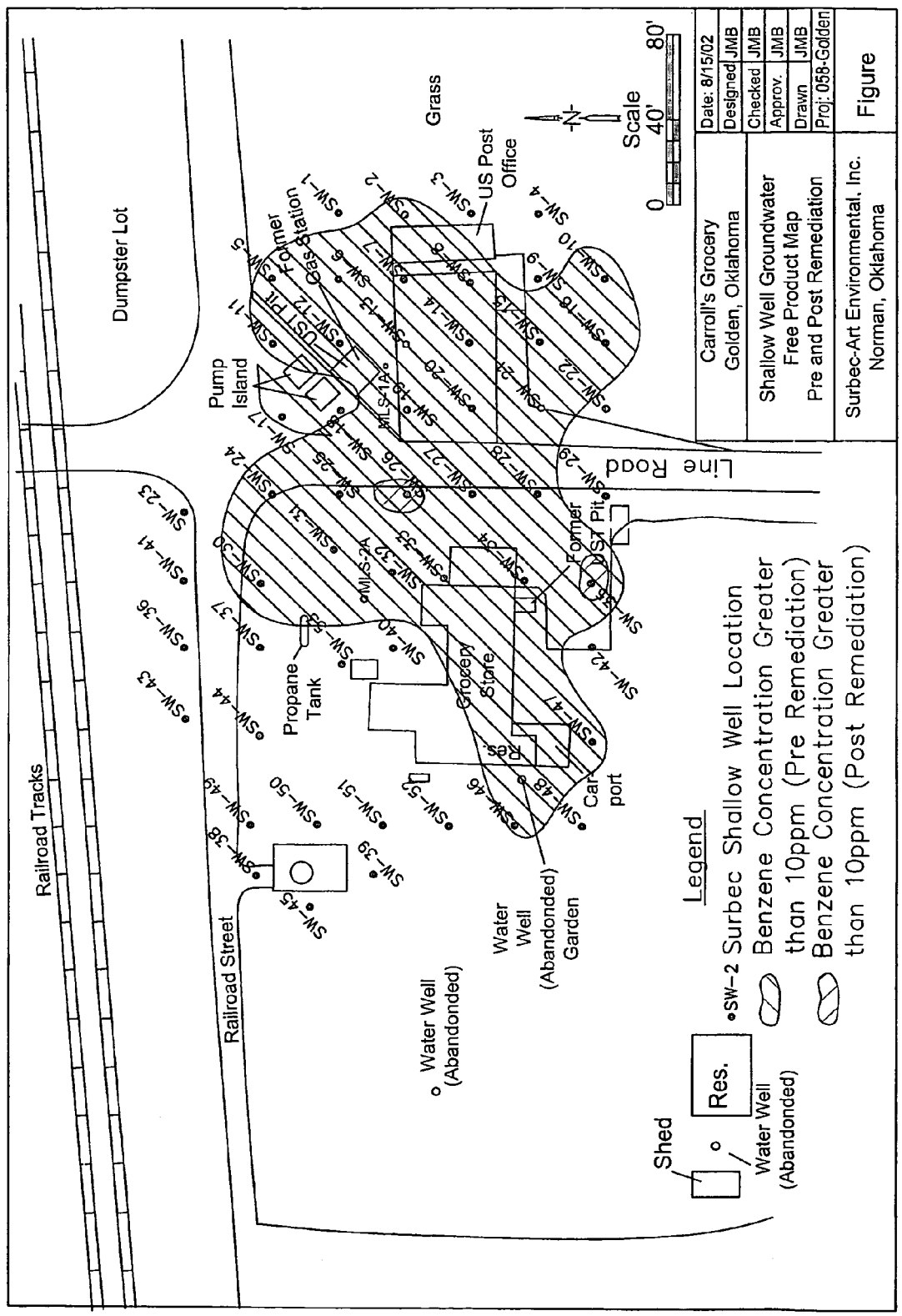
FIG. 4 is a schematic representation of pre- and post-surfactant flushing/chemical oxidation benzene concentration distribution methodology of the present invention in a "Shallow Zone" at an underground storage tank contamination site—i.e. Carroll's Grocery in Golden, Okla.

In situ surfactant flushing was used to recover free phase LNAPL (gasoline) using the low concentration surfactant (<1 wt %) and polishing oxidant methodology of the presently disclosed and claimed invention. One pore volume of 0.94 wt % AOT-Galfax16L-35 (Table IA) surfactant (190,000 gallons) was injected into the contaminated shallow zone (source area, mostly silty material) over a two month period to mobilize the trapped NAPL. Initial free phase gasoline thickness on the water table ranged between 2.7 feet to 3.3 feet. Representative results from the field remediation effort at the Golden UST site are shown in FIGS. 3 and 4 and in Tables 4 and 5.

TABLE 4

Representative Contaminant Concentration in Golden Soil before and after the Sequent Surfactant Flushing and Chemical Oxidation
Soil Sample Comparison Data
Pre-Flush vs. Post Flush

| | | Calfax/AOT Flush | | | | | Percent | Percent |
|---|---|---|---|---|---|---|---|---|
| Sample Number | Depth ft. bgl. | Benzene ug/kg | Toluene ug/kg | Ethylbenzene ug/kg | Xylenes Ug/kg | TPH-Gro mg/kg | Reduction Benzene | Reduction TPH-Gro |
| MLS-1A | 12.5 | 13400.0 | 58100.0 | 18800.0 | 92700.0 | 809.0 | | |
| PTGP-2A | 12.5 | 511.0 | 9970.0 | 3520.0 | 20600.0 | 164.0 | 96.2 | 79.7 |
| MLS-1B | 14.0 | 16000.0 | 185000.0 | 85300.0 | 454000.0 | 3630.0 | | |
| PTGP-2B | 14.0 | 2350.0 | 37300.0 | 14600.0 | 78600.0 | 548.0 | 85.3 | 84.9 |
| MLS-2A | 12.5 | 31800.0 | 438000.0 | 114000.0 | 595000.0 | 5080.0 | | |
| GP-7A | 12.5 | 2400.0 | 41800.0 | 17100.0 | 95700.0 | 691.0 | | |
| PTGP-9A | 12.5 | 225.0 | 476.0 | ND | ND | 56.0 | 99.3 | 98.9 |
| MLS-2B | 14.0 | 4980.0 | 26700.0 | 6640.0 | 38100.0 | 345.0 | | |
| PTGP-9B | 14.0 | 284.0 | ND | 527.0 | 3790.0 | 59.0 | 94.3 | 82.9 |
| DW-1A | 11.0 | 1900.0 | 14900.0 | 8750.0 | 48400.0 | 355.0 | | |
| PTGP-1A | 11.0 | ND | ND | ND | ND | 4.2 | >99 | 98.8 |
| DW-1B | 14.0 | 11200.0 | 99800.0 | 44900.0 | 250000.0 | 2190.0 | | |
| PTGP-1B | 14.0 | 2670.0 | 4920.0 | 7580.0 | 28400.0 | 137.0 | 76.2 | 93.7 |
| DW-5A[1] | 14.0 | 20800.0 | 148000.0 | 58800.0 | 326000.0 | 2780.0 | | |
| GP-6B | 14.0 | 1210.0 | 12720.0 | 5820.0 | 31900.0 | 325.0 | 94.2 | 88.3 |
| DW-8A | 14.0 | 41100.0 | 182000.0 | 54600.0 | 277000.0 | 2560.0 | | |
| PTGP-10A | 14.0 | 1060.0 | 42700.0 | 19700.0 | 104000.0 | 890.0 | 97.4 | 65.2 |
| DW-16A[1] | 11.0 | 9720.0 | 277000.0 | 129000.0 | 707000.0 | 5740.0 | | |
| PTGP-12A | 11.0 | ND | 118.0 | ND | ND | 19.0 | >99 | 99.7 |

Notes:
Background Concentration
[1] The 14 foot sample for DW-5A and DW-16A denotes the 14 foot depth, unlike DW-1A.

TABLE 5

Oklahoma Corporation Commission (OCC)/U.S. Environmental Protection Agency (U.S. EPA) Post Test Soil Sample Results

| Sample I.D. | Depth Ft. bgl. | Concentration, mg/kg | | | | |
|---|---|---|---|---|---|---|
| | | benzene | Toluene | ethyl-benzene | xylenes | TPH-Gro |
| PB-1 | 15.8 | 0.425 | 1.93 | 1.12 | 4.29 | 88.3 |
| PB-2 | 16.7 | 0.103 | 0.170 | 0.035 | 0.190 | 1.83 |
| PB-2 | 18.5 | 2.27 | 8.07 | 2.390 | 13.4 | 111.0 |
| PB-3 | 17.7 | 0.295 | 3.02 | 1.20 | 6.87 | 54.5 |
| PB-3 | 18.5 | 0.165 | 0.374 | 0.054 | 0.299 | 2.40 |
| PB-4 | 17.0 | 4.24 | 16.7 | 4.14 | 21.6 | 155 |
| PB-5 | 10.2 | 0.072 | 0.675 | 0.28 | 1.86 | 18.8 |
| PB-5 | 17.3 | 0.727 | 6.31 | 2.18 | 13.1 | 160.0 |

No visible or instrumental evidence of free phase gasoline was detected in 25 recovery and monitoring wells (three out of 28 wells had minimal thicknesses) during the post surfactant sampling event (FIG. 3). The observed benzene concentration indicated that 75%-99% reduction in soil concentrations were achieved during the surfactant flush (FIG. 4 and Table 4). Similarly, a reduction of TPH (GRO) concentrations in the soils was between 65%-99%. After surfactant flushing, the remaining trace residual and dissolved NAPL were treated by the final polishing steps using chemical oxidation in the shallow zone, where most NAPL was present before the surfactant flushing. Representative soil concentrations after the post-oxidation phase are summarized in Table 5. As shown in Tables 4 and 5, further contaminant reduction/degradation (OCC/EPA soil sampling event held in June, 2002) was observed after the post-polishing step was completed. These results indicate that the integrated surfactant flushing and chemical oxidation methodology of the presently disclosed and claimed invention is capable of remediating contaminants to substantially non-detected or extremely low level, if not completely removed, in a "real world" field-scale test.

EXAMPLE 2

Sequent Surfactant Flushing and Chemical Oxidation Polishing for DNAPL—a TCE-Contaminated Site The targeted site was contaminated by TCE, a DNAPL and common degreaser. The main focus of this experiment was to treat the dilute TCE plume with an in-situ chemical oxidation process. This approach was selected rather than treating the source zone NAPL because the DNAPL source zones could not be identified. Most laboratory efforts were focused on evaluating the effectiveness of two selected oxidants, potassium permanganate ($KMnO_4$) and Fenton's reagent, for TCE and cis-DCE degradation. A limited effort was given to evaluate the effectiveness of sequent surfactant flushing and chemical oxidation to treat the TCE-contaminated source (or hot) zone.

Use of Potassium Permanganate for TCE/DCE Degradation

Batch experiments were conducted to evaluate the degradation rates of TCE, cis-DCE, or their mixture by $KMnO_4$. These experiments were carried out in TCE/DCE dissolved solutions in the absence (Table 6) or presence (Table 7) of site-specific soil. As shown in Table 6, 250 mg/L $KMnO_4$ can degrade TCE or DCE completely at low contaminant levels. Initial contaminant concentrations ranged from several hundred of ug/L to more than 100 mg/L. As shown in Table 7, $KMnO_4$ concentrations ranging from 10 mg/L up to 10,000 mg/L (1%) solution were tested. Results indicated that most reactions between $KMnO_4$ and TCE, DCE, and TCE/DCE mixtures (between few hundreds ppb to 5 ppm) were complete after a 24-hr reaction period.

TABLE 6

Degradation Reaction of $KMnO_4$ and low level of TCE, DCE and their mixtures without soil

| Sample ID | Final TCE ug/L | Final DCE ug/L | KMnO4 added, mg/L | TCE, % degraded | DCE % degraded |
|---|---|---|---|---|---|
| DCE-C-8 (control) | 8 | 4820 | 0 | NA | 0 |
| DCE-100-8 | 3 | 691 | 100 | NA | 85.7 |
| DCE-250-8 | 0 | 22 | 250 | NA | 99.5 |
| TCE-C-8 (control) | 283 | 0 | 0 | 0 | NA |
| TCE-100-8 | 0 | 1 | 100 | 100 | NA |
| TCE-250-8 | 0 | 1 | 250 | 100 | NA |
| D&T-C-8 (control) | 70 | 1407 | 0 | 0 | 0 |
| D&T-100-8 | 0 | 14 | 100 | 100 | 99.0 |
| D&T-250-8 | 0 | 11 | 250 | 100 | 99.2 |

Note:
-8 samples were analyzed after 29 hrs of sample preparation.

TABLE 7

Degradation Reaction of $KMnO_4$ and TCE, DCE and their mixtures with two types of soil (Soil 1-26'-27'; Soil 2-18'-20', in 40 mL solution)

| Sample | Final TCE ug/L | Final DCE ug/L | $KMnO_4$ added mg/L | TCE % degraded | DCE % degraded |
|---|---|---|---|---|---|
| SDCE-C | 18 | 5486 | 0 | NA | 0 |
| SDCE-100 | 0 | 17 | 100 | NA | 99.7 |
| SDCE-250 | 0 | 16 | 250 | NA | 99.7 |
| STCE-C | 237 | 0 | 0 | 0 | NA |
| STCE-100 | 0 | 0 | 100 | 100 | NA |
| STCE-250 | 0 | 0 | 250 | 100 | NA |
| ST&D-C | 117 | 2432 | 0 | 0 | 0 |
| ST&D-100 | 0 | 13 | 100 | 100 | 99.5 |
| ST&D-250 | 0 | 12 | 250 | 100 | 99.5 |

Most reactions between $KMnO_4$ and TCE/DCE are completed in less than one hour under room temperature (20° C.). As shown in Table 8, experiments conducted with soil added indicate that complete degradation of TCE and DCE was observed under similar conditions.

TABLE 8

Degradation Reaction of $KMnO_4$ and high level of TCE without soil

| Sample ID | Final TCE mg/L | Initial $KMnO_4$ added mg/L | TCE % degraded |
|---|---|---|---|
| Control | 343 | 0.0 | 0 |
| T10000 | 0.0 | 10,000 | 100 |
| T5000 | 0.0 | 5,000 | 100 |
| T1000 | 0.0 | 1,000 | 100 |
| T500 | 111 | 500 | 67.7 |

The loss of $KMnO_4$ in two soil samples collected from the site were determined to be negligible during 4-, 7-, and 14-days of reaction period (data not shown). Low sorption loss of KMnO$_4$ reduced the amount of KMnO$_4$ required and the total cost of remediation project.

Under higher initial TCE levels (>300 mg/L), results indicate that adding 1,000 mg/L or more KMnO$_4$ completely degraded the added TCE. A 67.7% reduction of TCE was observed with 500 mg/L of KMnO$_4$ solution.

Batch study indicated that addition of potassium permanganate degraded dissolved TCE and DCE in the dilute plume near the vicinity of the soil sampling locations. In addition, other loss mechanisms for permanganate including sorption and fortuitous reactions with other reduced compounds were minimal in the tested samples.

Use of Fenton's Reagent for TCE/DCE Degradation

Fenton's reagent is the second oxidant tested. Fenton's reagent was prepared by dissolving H$_2$O$_2$ and catalysis Fe(II) (FeCl$_2$ or FeSO$_4$) in acidic solution (HCl or H$_2$SO$_4$).

Batch results indicated that Fenton's reagent degrades both TCE and DCE, but appears less efficient compared to KMnO$_4$ on a weight basis. For example, 283 ug/L TCE can be completely degraded by 100 mg/L KMnO$_4$ solution, yet 100 mg/L H$_2$O$_2$/FeCl$_2$ solution only oxidize 51.7% of TCE. For similar contaminant concentrations, DCE degradation required more Fenton's reagent than TCE. Note that some pollutants, such as trichloroethane (TCA) or BTEX, could not be completely degraded by KMnO4, but will be degraded effectively by Fenton's reagent.

The batch studies clearly indicate that both KMnO$_4$ and Fenton's reagent were candidates for degrading the target contaminant, TCE, and the common intermediate, DCE, at the selected sampling locations at the DNAPL-impacted site.

1-D Column Study with KMnO$_4$-Only for TCE Removal

Several column tests were conducted by injecting KMnO$_4$ at different concentrations (100, 500, 5000, 20000 mg/L) under various TCE residual saturation in the soil packed column. In the column study, fifteen to twenty five pore volumes of KMnO$_4$ were injected to evaluate the removal of TCE under the hydrodynamic conditions.

At a 1% initial TCE residual saturation, significant gas bubbles (mainly CO$_2$ gas) were observed in the effluent after a 5,000-mg/L KMnO$_4$ solution was injected, while TCE concentration also began to drop significantly (to less than 10 mg/L level). In another column test, a 10% TCE residual saturation was used with various KMnO$_4$ levels being injected (100, 500, 5,000, 20,000 mg/L). Similarly, numerous gas bubbles were created when higher KMnO$_4$ concentrations were injected (5,000 mg/L and above) (data not shown). In addition, dark brown MnO$_2$ precipitates were accumulated at various locations in the column.

After the KMnO$_4$ flushing, the treated column was dismantled and the soil was extracted with methanol to determine the final TCE concentration. The final TCE concentrations in the column ranged from 8 mg/Kg to 47 mg/Kg in different columns (both low and high initial TCE levels). A significant amount of TCE was degraded with KMnO$_4$ flushing. However, a significant release of CO$_2$ near the NAPL source area could potentially change the hydraulic permeability of the aquifer and lead to by-pass around the TCE ganglia preventing further removal, as other researchers have suggested. In addition, significant accumulation of MnO$_2$ precipitates at the interface of NAPL and water also reduce the mass transfer of KMnO$_4$ to TCE and decrease the TCE degradation rate. This problem has been observed in field trials with KMnO$_4$ and is a limitation of the technology for remediation of contaminated hot zone. Results from these column tests indicate that injection of KMnO$_4$ alone could effectively degrade TCE under proper conditions, such as for a TCE-impacted dissolved plume but not in areas with free phase DNAPL or high level of TCE residual saturation. Chemical oxidation is very effective for degrading a TCE dilute plume or as a polishing-step for source zone remediation after the majority of the TCE is removed by the surfactant flooding. The relatively low quantity of remaining TCE would be less likely to cause manganese precipitation and hydraulic bypassing upon reaction with KMnO$_4$.

Figure 5:
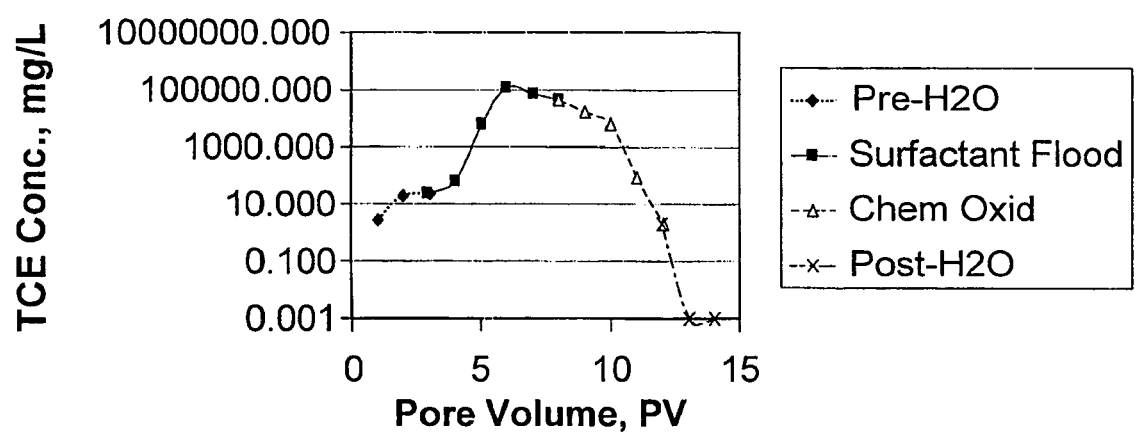
FIG. 5 is a graphical representation showing the results of a TCE breakthrough test with sequent surfactant and chemical oxidation flushing in a 1-D column.

1-D Column Study with Sequent Surfactant Flushing and Chemical Oxidation (KMnO$_4$) Flushing for TCE Removal Additional column tests were conducted using surfactant flushing to first remove significant TCE NAPL mass, followed by KMnO$_4$ flushing to degrade the TCE left in the column. Examples of the column study results are shown in FIG. 5. Initial TCE residual saturation was 2%. At 4 PV, a surfactant solution, containing 2.5% dihexyl sulfosuccinate (AMA), 5% diphenyl oxide disulfonate (Calfax), 3% NaCl, and 1% CaCl$_2$, was injected into the column. The selection of this surfactant system was based on a previous field test done for a mixed DNAPL contaminated site, containing tricholorethane (TCA), TCE, DCA, and DEC. The enhancement of TCA solubility with the selected surfactant system (Calfax/AMA/CaCl$_2$/NaCl) is listed in Table 9.

TABLE 9

Comparison of Trichloroethane (TCA) Solubilization in Batch and Column Studies

| Surfactant System | TCA Solubilized in Batch test (mg/L)[1] | Maximum TCA Solubilized in column test (mg/L) |
|---|---|---|
| Dowfax/AMA/NaCl/CaCl$_2$ | 99,259 | 168,996 |
| Lubrizol71/IPA/NaCl/CaCl$_2$ | 259,355 | NA[3] |

[1]Volume determined by volumetric addition of TCA during the phase behavior study
[2]Surfactant used in the sequent surfactant flushing/chemical oxidation test
[3]NA = not available A surfactant system used for TCA could be used for TCE (with similar hydrophobicity property) to produce a middle-phase microemulsion. Therefore, a mixture of Calfax/AMA surfactant was used to conduct this 1-D column test. Significant TCE mass (concentration reached 100,000 mg/L) was removed from the column after surfactant breakthrough. After 5 PV of surfactant flushing, a 2,000 mg/L KMnO$_4$ solution was injected to further degrade the TCE in the column. A total of 4 PV of KMnO$_4$ solution was injected in the column before post-water flushing began at 12 PV injection time.

Significant TCE mass was removed during the surfactant flushing period. A decrease of the TCE concentration, eventually below the quantification limit, after the KMnO$_4$ breakthrough, is also clearly demonstrated. Post column extraction indicated that 99.94% of the initial TCE was removed from the column. Note that the surfactant concentration used in this column test was 7.5 wt %. As shown in Table 10, a recent batch study conducted by Applicant indicates that a low surfactant concentration (<1 wt %) could achieve similar solubility enhancement for TCE.

TABLE 10

Solubilozation of DNAPL (TCE) Using
Low Surfactant Concentration (1 wt %)

| Sample Name | Phase | TCE Solubilized in bacth test mg/L | Note 1 wt % surfactant |
|---|---|---|---|
| fb-015s | middle | 177104 | Calfax/AOT |
| fb-015s | aqueous | 99577 | Calfax/AOT |
| fb-014s | middle | 383813 | Calfax/AOT |
| fb-014s | aqueous | 66677 | Calfax/AOT |
| fb-008 | aqueous | 152882 | Lubrizol System |

Therefore, a surfactant flushing with a low surfactant concentration system (e.g., Calfax/AOT—see Table IA for TCE) followed by a chemical oxidation step significantly improves the state of the art and makes it technologically and economically viable to completely remediate contaminated sites.

Although the present invention has been described in considerable detail with reference to certain preferred versions thereof, other versions are possible. For example, single surfactant systems such as anionic/anionic and nonionic/nonionic mixtures; surfactant systems such as anionic/cationic and anionic/nonionic mixtures; and contaminants such as polyaromatic hydrocarbons (PAH), creosote, crude oil, pesticides, polychorinated biphenyls (PCBs) and ketones can be utilized with this integrated approach. Therefore, the spirit and scope of the appended claims should not be limited to the description of the preferred versions contained herein.

REFERENCES

The following references, to the extent that they provide exemplary procedural or other details supplementary to those set forth herein, are specifically incorporated herein by reference in their entirety as though set forth herein in particular.

Abdul, A. S., Gibson, T. L., Ang, C. C., Smith, J. C., Sobezynski, R. E., 1992. "In situ surfactant washing of polychlorinated biphenyls and oils from a contaminated site." *Ground Water,* 30:219-231.

Abdul, A. S., Ang, C. C., 1994. "In situ surfactant washing of polychlorinated biphenyls and oils from a contaminated field site: phase II pilot study. *Ground Water,* 32:727-734.

Brown, C. L., Delshad, M., Dwarakanath, Jackson, R. E., Londergan, J. T., Meinardus, H. W., McKinney, D. C., Oolman, T., Pope, G. A., and Wade, W. H., 1999, Demonstration of surfactant flooding of an alluvial aquifer contaminated with dense nonaqueous phase liquid." in Innovative Subsurface Remediation, Field Testing of Pysical, Chemical, and Characterization Technologies, Brusseau, M. L., Sabatini, D. A., Gierke, J. S., Annable, M. D. (eds.), ACS symposium series 725, 64-85, American Chemical Society, Washington DC.

Cayias, J. L., Schechter, R. S., and Wade, W. H., 1975. "The measurement of low interfacial tension via the spinning drop technique. In Adsorption at Interfaces, ACS Symposium Series No. 8, Amer. Chem. Soc., Washington, D.C., pp. 234-247.

Fountain, J. C., Starr, R. C., Middleton, T. Beikirch, M., Taylor, C., and Hodge, D., 1996. "A controlled field test of surfactant-enhanced aquifer remediation," *Ground Water,* 34(5):910.

Haber, F., and Weiss, J. 1934. The catalytic decomposition of hydrogen peroxide by iron salts. Proceedings of the Royal Society of London, Series A, v. 147, p. 332-351.

Jawitz, J. W., Annable, M., Rao, P. S. C., and Rhue, R. D., 1998. "Field implementation of Winsor Type I surfactant/alcohol mixture for in situ remediation of a complex LNAPL as a single phase microemulsion," *Environ. Sci. and Technol.,* 32 (4): 523-530.

Knox, R. C., Sabatini, D. A., Harwell, J. H., Brown, R. E., West, C. C., Blaha, and Griffin, C. 1997. "Surfactant remediation field demonstration using a vertical circulation well," *Ground Water.* 35(6): 948-953.

Knox, R. C., Shiau, B. J., Sabatini, D. A., and Harwell, J. H., 1999. "Field demonstration studies of surfactant-enhanced solubilization and mobilization at Hill Air Force Base, Utah," in Innovative Subsurface Remediation, Field Testing of Pysical, Chemical, and Characterization Technologies, Brusseau, M. L., Sabatini, D. A., Gierke, J. S., Annable, M. D. (eds.), ACS symposium series 725, 49-63, American Chemical Society, Washington DC.

Lipe, M., Sabatini, D. A., Hasegawa, M., and Harwell, J. H. 1996. *Ground Water Monitering and Remediation.* 16(1): 85-92.

Martel, R., Gelinas, P. J. and Desnoyyers, J. E., "Aquifer washing by micellar solutions: 1 Optimization of alcohol—surfactant—solvent solutions," *J. Contaminant Hydrology.* 1998a. 29(4): 317.

Martel, R., Rene, L, and Gelinas, P. J., 1998b. "Aquifer washing by micellar solutions: 2. DNAPL recovery mechanisms for an optimized alcohol—surfactant—solvent solution," *J. Contaminant Hydrology.* 30(1-2):1.

Pennell, K. D., Jin, M., Abriola, L. M., Pope, G. A., 1994. "Surfactant-enhanced remediation of soil columns contaminated by residual tetrachloroethylene, *J. Contaminant Hydrology.* 16: 35-53.

Pennell, K. D., Pope, G. A., Abriol, L. M., 1996. "Influence of viscous and buoyancy forces on the mobilization of residual tetrachloroethylene during surfactant flushing. *Environ. Sci. Technol.* 30: 1328-1335.

Reitsma, S. and Marshall, M, 2002, "Experimental Study of Oxidation of Pooled NAPL," in *Chemical Oxidation and Reactive Barriers: Remediation of Chlorinated and Recalcitrant Compounds, The Second International Conference on Remediation of Chlorinated and Recalcitrant Compounds.* eds. G. B. Wickramanayake, A. R. Gavaskar, A. S. C. Chen, Battelle Press, Columbus, Ohio, pp. 25-32.

Rouse, J. D., Sabatini, D. A., Harwell, J. H., 1993, *Environmental Science & Technology,* 27: 2072

Sabatini, D. A., Harwell, J. H., and Knox, R. C., 1998a. "Surfactant selection criteria for enhanced subsurface remediation: Laboratory and field observations." *Progr. Colloid Polym Sci.* 111: 168-173.

Sabatini, D. A., Harwell, J. H., Hasegawa, M., and Knox, R. C., 1998b. "Membrane processes and surfactant-enhanced subsurface remediation: results of a field demonstration," *Journal of Membrane Science,* 151: 87-98.

Shiau, B. J., Sabatini, D. A., Harwell, J. H., 1994, *Ground Water,* 32: 561.

Shiau, B. J., Sabatini, D. A., Harwell, J. H., 1995, *Envrionmental Science & Technology,* 29: 2929.

Shiau, B. J., Sabatini, D. A., Harwell, J. H., 2000, "Chlorinated solvent removal using food grade surfactants: column studies," *J. of Environmental Engineering,* 126(7): 611.

Shiau, B. J., Hasegawa, M. A., Brammer, J. M., Carter, T., Goodspeed, M., Harwell, J. H., Sabatini, D. A., Knox, R. C., Szekeres, E., 2002. "Field demonstration of surfactant-enhanced DNAPL remediation: two case studies," in Chlorinated Solvent and DNAPL Remediation. Innovative Strategies for Subsurface Cleanup, Henry, S. M., Warner, S. D. (eds.), ACS symposium series 837, 51-72, American Chemical Society, Washington DC.

What is claimed:

1. A method for substantially removing subsurface contaminants, comprising the step of introducing an effective amount of a mixture of sodium dioctylsulfosuccinate, linear alkyl diphenyloxide disulfonate, and water, wherein the weight percent of the sodium dioctylsulfosuccinate and linear alkyl diphenyloxide disulfonate in the mixture is in a range from about 0.05% to about 15% by weight of the mixture.

2. The method of claim 1, wherein the subsurface contaminant is a dense non-aqueous phase liquid.

3. The method of claim 1, wherein the subsurface contaminant is a light non-aqueous phase liquid.

4. A method for substantially removing subsurface contaminants, comprising the step of introducing an effective amount of a mixture of sodium dioctylsulfosuccinate, linear alkyl diphenyloxide disulfonate, and water, wherein the weight percent of the sodium dioctylsulfosuccinate and linear alkyl diphenyloxide disulfonate in the mixture is in a range from about 3% to about 8% by weight of the mixture.

5. The method of claim 4, wherein the subsurface contaminant is a dense non-aqueous phase liquid.

6. The method of claim 4, wherein the subsurface contaminant is a light non-aqueous phase liquid.

7. A method for substantially removing subsurface contaminants, comprising the step of introducing an effective amount of a mixture of sodium dioctylsulfosuccinate, linear alkyl diphenyloxide disulfonate, and water, wherein the weight percent of the sodium dioctylsulfosuccinate and linear alkyl diphenyloxide disulfonate in the mixture is in a range from about 1% to about 3% by weight of the mixture.

8. The method of claim 7, wherein the subsurface contaminant is a dense non-aqueous phase liquid.

9. The method of claim 7, wherein the subsurface contaminant is a light non-aqueous phase liquid.

10. A method for substantially removing subsurface contaminants, comprising the step of introducing an effective amount of a mixture of sodium dioctylsulfosuccinate, linear alkyl diphenyloxide disulfonate, and water, wherein the weight percent of the sodium dioctylsulfosuccinate and linear alkyl diphenyloxide disulfonate in the mixture is in a range from about 0.05% to about 1% by weight of the mixture.

11. The method of claim 10, wherein the subsurface contaminant is a dense non-aqueous phase liquid.

12. The method of claim 10, wherein the subsurface contaminant is a light non-aqueous phase liquid.

* * * * *